Patented Sept. 15, 1936

2,054,072

UNITED STATES PATENT OFFICE 2,054,072

SUBSTITUTE FOR BUTTER INTENDED FOR USE IN TROPICAL REGIONS

Carleton Ellis, Montclair, N. J., assignor to Ellis-Foster Company, a corporation of New Jersey No Drawing. Application September 10, 1930, Serial No. 481,083. Renewed May 2, 1935

7 Claims. (Cl. 99—123)

This invention relates to a substitute for butter, of a character intended especially for use in tropical regions and the like and relates especially to a butter substitute in which a highly refined mineral oil is incorporated with stearin bodies, more particularly synthetic stearin as derived by the hydrogenation of vegetable oils, to yield a product of about the consistency of butter, preferably, however, free from moisture.

The mineral or petroleum oil forming the basis of the composition is preferably of the medicinal oil type, that is, one which has been so thoroughly refined that the taste or flavor normal to the cruder oils from which it is obtained is substantially or completely eliminated. Oils of this type having a specific gravity of .875 to .845 are suitable, although a broader range of specific gravity may be employed in some cases. Oils on the market availble for the purpose are the well-known "Nujol" and also a product of somewhat lower specific gravity known by the name of "Marcol." These mineral oils are highly stable products, unlikely to undergo any deterioration on keeping in a hot climate that would impair the edibility of the product containing them.

As a thickening agent a hydrogenated fatty oil preferably is employed, particularly one of high or even maximum melting point of the character known as "hardened fat." Since the product is likely to be distributed in some cases in areas where there may exist religious scruples against the use for edible purposes of products containing animal fats, I preferably use a hydrogenated vegetable oil, specifically hydrogenated cottonseed, corn or soya bean oil, or mixtures of these being preferred. A main feature is the production of a butter substitute having an agreeable taste which effect is aided by deodorizing the hydrogenated oil or hard fat. Preferably this should be blown with steam in vacuum at an elevated temperature to remove foreign taste or flavor imparted by the hydrogenation process. Such oil, which may be termed "steam-blown", is then ready for incorporation with the refined petroleum oil. Ordinarily a steam-blown hard fat made from cottonseed oil and haviing a melting point of about 60° C. is suitable. For various reasons, including the feature of high stability, I prefer to use a maximum proportion of the mineral oil component, up to about five-sixths of the total composition as mineral oil. Ordinarily a proportion of one part by weight of the hard fat to five parts of the mineral oil is suitable, although the proportion of the hard fat should be increased when climatic temperatures require it.

These materials are incorporated suitably by melting the hard fat and mixing with the mineral oil, the latter being heated if desired, and passing the mixture over a chill roll in a thin layer to cause rapid solidification. By this treatment a lesser proportion of hard fat suffices than otherwise would be the case.

To secure a product more closely resembling butter in general appearance and therefore more attractive when used on bread (or in other ways as butter is used other than when employed for cooking operations), there may be added a small amount of a coloring agent which is soluble in the mineral oil or soluble in the resulting composition as, for example, dimethylaminoazobenzene. This compound tends to give a slightly abnormal shade of yellow and I prefer to add a small proportion of an oil-soluble red dye which is suitable for addition to edible products, thereby tending to produce the orange-yellow shade of ordinary butter.

Also a small amount of an oil-soluble butter flavor such as various ethyl esters or mixed esters of butyric, propionic and caproic acid, can be added advantageously.

Still another desideratum is that of the introduction of salt in a manner which will permit of its remaining in relatively permanent suspension in the product. The specific gravity of the oil and fat composition being less than 1, while the specific gravity of salt is above 2, any salt addition tends to settle, especially when the composition is subjected to quite high atmospheric temperatures. Collecting at the bottom of a container the salt is thus removed from the major portion of the contents thereby (to some extent at least) and the palatability of the upper portion is considerably reduced by the absense of such salt. It is desirable, instead of using the ordinary fine crystalline salt as obtained on the market, to grind such salt with the mineral oil in a mill which will reduce the salt to a state of great fineness, thereby increasing its qualities of suspension. Still another procedure is that of using very light woody material, particularly a pithy substance such as ordinary corn pith which floats very readily in the composition and impregnate such pith with a solution of salt and dry it, in order to add thereto only such an amount of salt as give the resultant particles a specific gravity approximating that of the butter substitute composition. In this way the salt can be suspended by a floating agent in finely divided state or as a substantially impalpable powder in a manner which will permit its fairly uniform distribution throughout the composition and at the same time be present in a form which does not render the composition granular.

The physical appearance of the composition from the standpoint of a butter substitute is improved by an after treatment on leaving the chill roll. This treatment consists in squeezing or straining through a cloth or forcing the chilled material through a homogenizer, thereby improving that translucent or semi-opaque quality characteristic of butter and at the same time tending to reduce the formation of crystalline nuclei which would give the product a granular appearance.

A product so made may be packaged in ordinary containers or, if desired, may be saturated with an inert gas such as nitrogen or carbon dioxide and the container filled therewith in order to eliminate all oxygen. Such treatment is not necessary except possibly for extreme service conditions.

As stated, the proportion of the hydrogenated fat will vary depending upon the consistency desired and the temperature conditions to be met. In general for butter-like consistency 1 part or less of hydrogenated oil (cottonseed hard fat, melting point 59–60° C.) should be used to 4 parts of the mineral oil, preferably employing chill roll solidification and "creaming" the product by pressing or squeezing.

Proceeding in the manner described above, the following proportions may be used, the proportions given being parts by weight:

Example 1

| | |
|---|---:|
| Mineral oil ("Nujol") | 16,600 |
| Cottonseed hard fat (M. P. 60° C.) | 3,400 |
| Salt | 600 |
| Dimethylaminoazobenzene | 0.2 |

Butter flavor 1 part in 10,000 parts of the above composition

Example 2

| | |
|---|---:|
| Mineral oil ("Marcol") | 8,300 |
| Cottonseed hard fat | 1,700 |
| Salt | 300 |

Color and flavoring as above

Example 3

| | |
|---|---:|
| Mineral oil ("Marcol") | 8,000 |
| Hard fat as above | 2,000 |
| Salt | 300 |

Color and flavor as above

Example 4

| | |
|---|---:|
| Mineral oil ("Nujol") | 16,600 |
| Hard fat as above | 4,000 |
| Salt | 600 |

Color and flavor as indicated

While the illustrations are based upon the use of the cottonseed hard fat, it should be understood, as I have indicated in the foregoing, that hydrogenated stearins made from other oils may be employed and also beef stearin or similar natural fats. When hydrogenated oil is used it preferably, as indicated, should be steam-blown to remove hydrogenation taste and also the taste imparted by clay or fuller's earth employed in bleaching and the like.

Example 5

The salt employed in Examples 1 to 4 is impregnated into a light floating agent such as pith substances and incorporated in the fat in order to secure a more permanent salt suspension, the proportion of salt to floating agent being adjusted according to the specific gravity of the ultimate composition.

In my Patent 1,417,893, May 30, 1922, I describe a composition in which medicinal paraffin oil and hydrogenated cottonseed oil are present, along with milk material to produce butter-like products. Therein I state that these oily and fatty materials may be churned with sour milk and further state that if desired the water may be removed and an anhydrous or nearly anhydrous buttery composition obtained. When such a product is made and the water removed to yield an anhydrous or nearly anhydrous product, there is distributed through the oily medium small particles of casein or other perishable substances present in the milk and the stability of the composition is impaired. The preferred composition of the present invention avoids the introduction of any casein or similar protein substance which may prove unsuitable in tropical climates and the preferred form of the invention is characterized by the complete absence of any such material. By producing a composition substantially free from protein material, but nevertheless having somewhat the flavor of butter, I am able to provide an edible fat or oil product which is stable in character and substantially free from bodies serving as a growth medium for molds.

In its preferred form the composition, therefore, is mold-stable due to the absence of proteins or other substances which would serve as food for common molds, the composition preferably containing vegetable hydrogenated oil which has been steam-blown and also containing common salt which has been ground with the mineral oil component or with some part of the oil or fat employed in the composition. Oil-ground salt is better from the standpoint of suspension than salt in its normal cubical crystalline state. It is proposed in this manner, or by the use of a floating agent or otherwise, to place the salt in a state of substantially permanent suspension; so long as the fatty composition is not actually heated sufficiently to melt it. A specific feature is that of homogenizing the composition to secure a better degree of translucency akin to that of butter. A chilled and homogenized composition of the character described forms one phase of the invention. Another specific feature is that of freedom from moisture, that is, a product of an anhydrous or substantially anhydrous character which in itself tends to increase stability.

Finally, it may be noted that the composition made in accordance with the preferred manner set forth above may be used as a shortening for foods such as pastry, cakes, crackers, and the like, and does not, according to repeated tests, leave in the mouth that greasiness characteristic of petroleum oils. In other words, treatment according to the foregoing tends to so diminish the characteristic greasy feel of petroleum oils on the mucous membrane that it is not readily detected. The term "non-greasy" as used in certain of the claims refers to the substantial absence of petroleum-greasiness in food products, especially baked products, made with a shortening agent of the character set forth above.

What I claim is:

1. An edible composition of butter-like appearance adapted for use in tropical countries consisting of refined mineral oil of the medicinal oil type, deodorized hydrogenated vegetable oil of high melting point and a few percent of oil-ground salt, the latter being in finely divided state.

2. In the production of an edible composition of butter-like appearance adapted for use in tropical countries and consisting principally of refined mineral oil of the medicinal oil type, deodorized hydrogenated vegetable oil of high melting point and a few per cent of salt, the latter being in finely divided state, the employment of solid salt incorporated with a substantially tasteless floating agent capable of maintaining said solid salt in more permanent suspension in said composition than is possible in the absence of said floating agent, the said composition of salt and floating agent being of substantially lower specific gravity than the salt alone.

3. A product according to claim 1, of a substantially anhydrous character.

4. An ingredient for butter substitutes comprising a hydrogenated oil and an oil-ground salt.

5. An ingredient for butter substitutes comprising salt ground in a mineral oil.

6. An ingredient for butter substitutes comprising finely divided solid salt and a substantially tasteless floating agent for the salt, maintaining the latter in substantially more permanent suspension in oil material of lighter specific gravity than the salt, than can be done in the absence of said floating agent.

7. A butter substitute having substantially the appearance, taste and consistency of butter, containing a highly purified viscous mineral oil as its largest constituent, which oil is substantially free from raw petroleum taste, the amount of which oil is several times greater than the sum of all the other constituents, and containing salt uniformly distributed therein in a substantially non-settling condition, such product being substantially free from liability to mold, and substantially more stable and more free from tendency to rancidify than is real butter, and which product when used as shortening, gives baked products which are substantially non-greasy.

CARLETON ELLIS.